Figure 1:
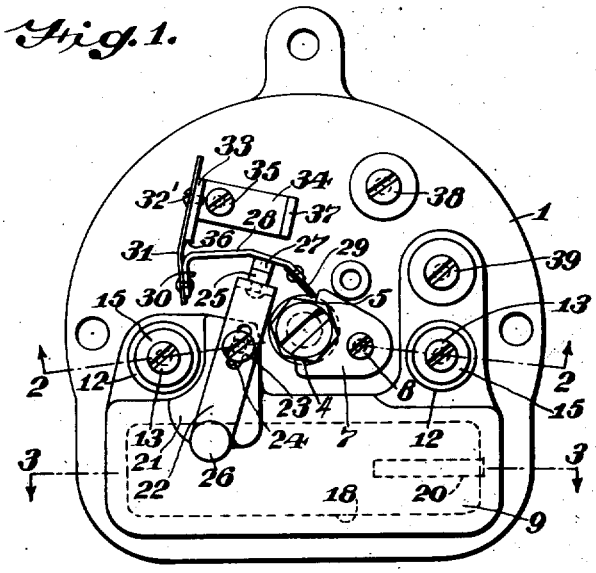

A. A. KENT.

CONTACT DEVICE.

APPLICATION FILED MAR. 30, 1920.

Reissued June 21, 1921. 15,128.

INVENTOR.

Arthur Atwater Kent

BY Cornelius D. Ehret his ATTORNEY.

UNITED STATES PATENT OFFICE.

ARTHUR ATWATER KENT, OF ARDMORE, PENNSYLVANIA.

CONTACT DEVICE.

15,128. Specification of Reissued Letters Patent. Reissued June 21, 1921.

Original No. 1,289,036, dated December 24, 1918, Serial No. 121,807, filed September 23, 1916. Application for reissue filed March 30, 1920. Serial No. 370,017.

*To all whom it may concern:*

Be it known that I, ARTHUR ATWATER KENT, a citizen of the United States, and a resident of Ardmore, Montgomery county, State of Pennsylvania, have invented certain new and useful Improvements in Contact Devices, of which the following is a specification.

My invention relates to contact devices for use in making and breaking a primary circuit in an electric sparking system of an internal combustion engine, and more particularly to those contact devices which operate to instantaneously break and then close again a normally closed primary electric circuit, that is to say, the primary circuit is normally held closed by the contact maker or contact device and the said device operates to break instantaneously the primary circuit in order to induce a current in the secondary circuit sufficient to cause a spark at spark plugs in the cylinders, which plugs are in the secondary circuit.

The objects of my invention are to provide a contact device or contact maker which will positively instantaneously break and will then instantaneously close the primary circuit, with accuracy and precision as to the time when the circuit is broken, and closed again, even when the circuit is being so broken at very high speeds, as for instance, 400 or 500 times per second, or even at higher speeds; to provide a device in which even at high speeds the circuit is practically closed all the time except as the same is broken by the operating mechanism; to provide a device in which the pitting or roughening of the co-acting surfaces of the contact points themselves is prevented; to avoid and prevent any movement of the lever or member which carries the movable contact point, independently of that motion or movement which is positively imparted thereto by the mechanism for moving the said contact arm or member in a fixed and pre-determined path; to provide a vibratory arm or movable contact point carrier of very small inertia which will follow a rapidly rotating cam to break and make the circuit, maintaining practically constant the ratio of the extents of time during which the circuit is open and closed; will yield slightly longitudinally of said arm but in which the substantial pivotal point about which said arm vibrates is rigid or unyielding in a direction transverse to said arm or member; to provide a contact maker which is simple in construction, is easily manufactured, is provided with relatively few and simple parts, and in which the wear of the moving parts is substantially nothing.

Figure 2:
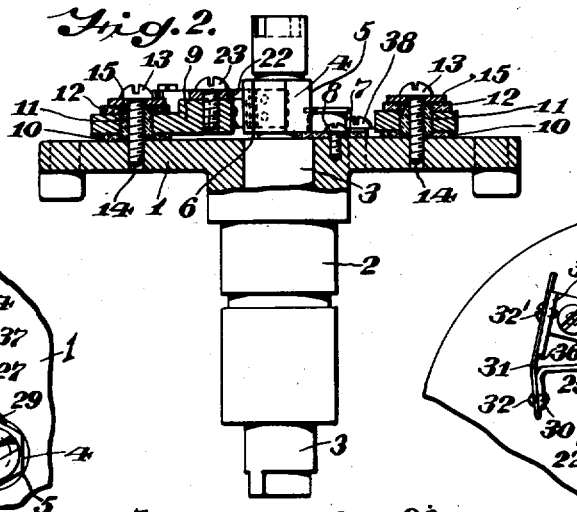
Figure 4:
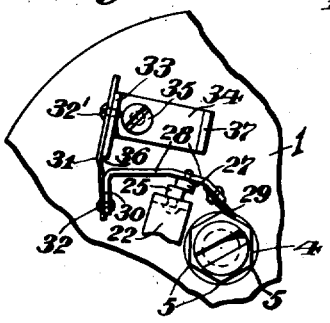
Figure 5:
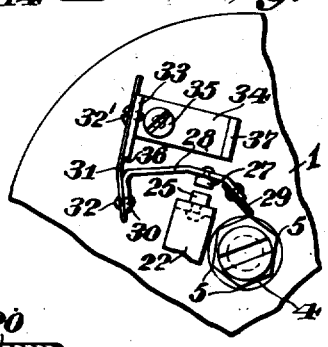
Figure 3:
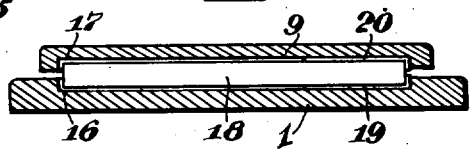
Figure 6:
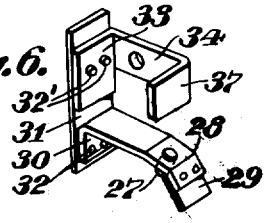

Other objects of my invention will appear in the specification and claims below:

Referring now to the drawings in which the same parts are designated by the same reference characters throughout the various views, Figure 1 is a plan view of my improved closed circuit contact maker; Fig. 2 is a vertical or side elevational view partly in section, the section being taken on the line 2—2 of Fig. 1; Fig. 3 is a sectional view of a portion of the device shown in Fig. 1, the section being taken on the line 3—3 of Fig. 1 and showing the manner of mounting and holding the condenser in such a way that its terminals are in electrical engagement with the movable and stationary contact points, respectively; Figs. 4 and 5 are similar fragmentary views showing in a somewhat exaggerated manner the character of the movement which is imparted to the movable contact point arm or member by the cam coöperating therewith, and Fig. 6 is a plan view of the movable contact point arm and the mounting therefor detached from the base and in which the spring about which the arm is adapted to vibrate is shown in its normal or unflexed position or condition.

At substantially the center of the base 1 and journaled in a hub 2, projecting from the under side thereof, is a shaft 4, upon the upper end of which, and above the top of the base 1, is a cam 4, having as many projections 5 spaced equally around the periphery thereof as there are cylinders in the engine to be successively ignited. In the device shown in the drawings there are six of these projection 5, and the cam 4 is therefore preferably made as a regular hexagon, the center of which is coincident with the center of the shaft 3. It will, of course be understood that if the device is to be used with a four cylinder engine the cam will be a square cam, and if the same is to be used with an eight cylinder engine the cam 4 will be octagonal. The periphery of the cam 4 is preferably made very smooth and may be highly polished and the angles between the flat faces of the cams are slightly rounded over, and are made smooth, so that the projections 5 will not appreciably wear the cam follower arranged to bear against it, as will be later described, and to eliminate friction.

The shaft 3 is mounted to turn freely in the hub or bearing 2 and is adapted to be driven by and at suitable speed with relation to the main shaft of an internal combustion engine. To prevent longitudinal movement of the shaft with respect to the base, 1, I preferably provide the shaft 3 with a groove 6, into which projects a keeper 7 secured to the base 1 by a screw 8.

Upon the base 1 is mounted a metal cap or cover 9, the same being electrically insulated from the base 1. In order to insulate the cap 9 from the base 1 washers 10—10 of insulating material are placed between the cap 9 and the base 1, and within these washers are fitted bushings 11—11, of insulating material, which extend into the washers 10—10, and through suitable openings in the cap or cover 9, said bushings 11—11 projecting above the top surface of the cap or cover 9. Around the upper ends of the bushings 11—11 are placed washers 12—12 resting against the top surface of the cap 9. Through the bushings 11—11 screws 13—13 are respectively inserted and are threaded into suitable tapped holes 14—14 in the base plate 1. Preferably metal washers 15—15 are placed between the heads of the screws 13 and the upper washers 12, and this is plainly illustrated in Fig. 2.

The base 1, under the cap or cover 9, is preferably provided with a recess or depression 16, while the cap or cover 9 is provided with a similar recess or depression 17 adapted to receive and retain a condenser 18, the terminals of which are preferably bent over the end of the condenser, to lie on the outside thereof longitudinally of the condenser, the lower terminal 19 resting against the metal base 1 and the upper terminal 20 resting against the metal cover 9.

The portion 21 of the top of the cover 9 is flat and smooth and adapted to form a surface, against which the bar 22, forming a support for the relatively stationary contact point, may be securely clamped, as by a set screw 23 passing through an elongated slot 24 extending longitudinally of said bar 22, said set screw being screwed into a suitable tapped hole in said flat portion 21. One end of the said bar is down-turned and to said down-turned portion is secured the stationary contact point 25, and the other end of said bar 22 is preferably provided with a knob or handle 26.

The movable contact point 27 is mounted on the movable contact point arm lever or member 28, to the free end of which is preferably riveted or otherwise fixedly secured a fiber end or tip 29; the other end of said movable contact point arm or lever is bent to form a projecting portion 30 extending transversely to the length of the main or body portion of the arm or lever 28, to provide suitable means for attachment of a spring serving as support for arm 28 and allowing movement thereof. This movable contact point arm 28 is preferably made out of stiff light sheet metal and the fiber end or tip 29 is preferably formed out of a thin sheet of stiff fiber.

To the outer or rear surface of the projecting portion 30 of the arm or lever 28 is riveted a resilient leaf spring 31, the rivets 32 being preferably spaced near the end of said projecting portion 30 and removed from the angle between the said projecting portion 30 and the main or body portion of the lever 28. Said spring 31 is preferably normally substantially flat and straight and its other end is preferably secured in any suitable manner as by screws 32′ to an upwardly extending portion 33 of a bracket or support 34, preferably secured to the base 1 by a set screw 35 threaded into the base 1. The screws 32′ (preferably two in number) are secured to the upwardly projecting portion 33 of the bracket 34 at a point removed from that free edge 36 of said portion 33 nearest the arm or lever 28, and said free edge 36 is slightly spaced from the said lever 28. The bracket 34 is pivotally adjustable about the set screw 35 so that the spring 31 may be subjected to substantially any amount or degree of tension desired, as will be referred to below.

The bracket 34 is preferably provided at its end opposite the upwardly extending portion 33 with a projection 37, also extending upwardly, and which serves as a handle or finger piece to assist in the adjustment of the bracket 34.

In Fig. 6 the movable contact point arm, lever, or member is shown in its assembled condition before mounting upon the base 1 and the spring, as shown, is straight and substantially flat bearing against the outer surface of the projecting portion 30 of the arm 28 and the surface of the projection 33, the spring not being under tension.

Preferably the bracket 34 is attached to the base 1 and is adjusted about the set screw 35 in such a manner as to cause the fiber tip 29 of the lever 28 to bear with considerable pressure on the surface of the cam 4, and then the bar 22 forming the support for the relatively stationary contact point 25 is adjusted so that the fiber end or tip 29 will be engaged by the outer rounded edge of the cam projections 5 as the cam 4 is rotated, the bar 22 being so adjusted that as a projection 5 passes under the fiber end or tip 29 of the movable contact point arm 28 the movable contact point 27 will be separated from the stationary contact point 25 to break the circuit.

The base plate 1 is preferably provided with a binding screw 38 and the cap or cover 9 is also provided with a binding screw 39 adapted to be attached to the terminals of the primary circuit of a sparking system of an internal combustion engine. In this manner the primary circuit will be closed whenever the contact points 25 and 27 are in engagement with each other and will be broken when the contact point 27 is separated from the contact point 25 by reason of the engagement of the fiber end or tip 29 with a projection 5 of the cam 4.

As shown in Fig. 1 the fiber end or tip 29 is preferably so adjusted by the bar 22 that it does not rest on the cam for a considerable portion of the travel of the cam between two adjacent projections 5 and the distance that the tip 29 engages the cam as it rides over a projection 5 is short as compared with the distance that the tip 29 is out of engagement with the cam, and it will be noted that the contact points 25 and 27 are in engagement with each other except during that period that the small portion of the surface of the cam which actually strikes or engages the fiber end or tip 29 of the lever 28 is in engagement therewith. The length of time during which the tip 29 is in engagement with the cam 4 is thus adjusted by the bar 22 forming the support for the movable contact point, and the tension with which the contact points 25 and 27 are pressed together and by which the contact point 27 is returned to the contact point 25, after the cam projection 5 has passed from under the tip 29, is adjusted by loosening the set screw 35 and turning the bracket 34 about the screw 35 as a pivot.

The tip 29 of the arm or lever 28 is disposed at an angle to the surface of the cam with which it coöperates and there is a slight tendency of the projection 5 of the cam 4 to first draw the movable contact point arm or lever 28 longitudinally as clearly shown in a greatly exaggerated manner in Fig. 4, and as the cam continues its movement the contact points are separated as shown in Fig. 5. This slight sliding of the contact points over each other is effected by the disposing of the tip 29 of the lever 28 in such a manner that it tends to slightly hold to the surface of the cam projections 5, as they travel underneath it, and the resilient light leaf spring 31 permits of such limited movement. The length of the spring between the free edge 36 of the bracket 34 and the rivets 32 spaced from the angle formed in the movable contact point arm 28 by the projecting portion 30 is relatively large and permits such a movement. This slight rubbing of the contact points over each other tends to burnish them, and to maintain a clean contact between them, and this prevents the arcing or sparking of the primary current as it is broken and made again at the contact points and the pitting or roughening of the contact points as a consequence of such arcing.

The condenser 18 mounted, as above described, between the cover and the base plate is in electrical engagement with the contact points and bridges the gap between them when they are separated.

Inasmuch as the arc through which the cam 4 revolves while the cam is in engagement with the tip 29 is small as compared with the arc through which it turns while the contact points are closed and the tip 29 is out of engagement therewith, the primary circuit will be closed for a greater length of time than it is broken and the device is therefore a normally closed circuit contact device.

While I have described one manner in which my invention may be embodied, I do not wish to be construed as limited strictly to the details above shown and described as the device is capable of some modification to adapt it for use with different engines having different numbers of cylinders and to operate with currents of different strengths.

The tip 29 is preferably of fiber because of its smooth wearing, or rather non-wearing, properties and its anti-friction properties. With the tip composed of fiber there is substantially no wear upon the cam, and by reason of the smooth surface of the cam the wear of the cam-engaging end of the fiber is exceedingly slight. While the spring 31 is resilient enough to allow the slight longitudinal movement of the movable contact point arm, as above described, it is rigid transversely to the length of the lever 28, that is to say, the apex of the angle between the projecting portion 30 and the main or body portion of the arm 28, is substantially immovable in a direction transverse to the main portion of the arm 28. This construction allows the arm 28 readily to follow the cam 4 by a flexure of the spring 31, particularly within the short length thereof lying between the left end of the arm 28 and the end 36 of the bracket member 34. The structure prevents undesirable vibrations of the arm 28 such as would be allowed or would occur in case the spring 31 extended substantially in the same direction as the longitudinal extent of the arm 28, in lieu of at relatively great angle thereto, in which latter position the spring 31 would be compelled to vibrate longitudinally of itself to permit the aforesaid undesired vibrations of arm 28. Furthermore, because of the very small inertia of the arm 28 and the parts movable therewith, the arm 28 faithfully follows the cam 4, and is not thrown off and tardily returned as in the case of movable arms and associated parts having relatively greater weight and momentum. With moving parts of such small inertia, a relatively weak spring, as shown, may be employed. Furthermore, the diameter of the cam is relatively small and the pressure exerted thereon by the spring 31 is small, both factors contributing materially to reduction of wear.

Having thus described my invention what I claim and desire to protect by Letters Patent of the United States is:

1. In a closed circuit contact device the combination of a movable contact point, a relatively stationary contact point, means to yieldingly hold said contact points normally in engagement with each other to close a circuit, and means to slightly transversely slide said movable contact point on said stationary contact point and to then separate said movable contact point from said stationary contact point, said yielding means being operative to move said movable contact point into engagement with said stationary contact point the instant they are separated.

2. In a contact device the combination of a rotatable cam provided with a polished surface, a movable contact point arm having its free end riding on the smooth surface of said cam and a flexible support upon which the other end of said arm is mounted, said support permitting the free end of said arm to oscillate transversely to the length of said arm and permitting said arm to reciprocate slightly longitudinally.

3. In a contact device the combination of a rotatable cam, a movable contact point support comprising a relatively stiff light arm, a fiber tip on the free end of said arm adapted to ride on the surface of said cam, the other end of said arm being provided with a portion projecting transversely to the general direction of said arm, a support having a flat surface extending transversely to the general direction of said arm, and a flat leaf spring rigidly attached to the said flat surface of said support and to the flat surface of said transversely extending portion of said arm, said support being slightly spaced from said arm.

4. In a contact device the combination of a rotatable cam, a movable contact point support comprising a relatively stiff flat light arm, the free end of which projects into the path of said cam and the other end of which is extended at substantially right angles to the main portion of said arm, a support having a flat surface extending transversely to said arm and in a plane disposed at a slight angle to said bent portion of said arm, and a flat spring rigidly attached to said support and said extended portion of said arm, said support and said arm being slightly spaced from each other and connected by said spring.

5. In a contact device the combination of a rotatable cam, a movable contact point support comprising a stiff light metal arm, a tip of non-conductive material on the free end of said arm arranged to ride on the surface of said cam, making a slight angle with the main portion of said arm and extending in the direction of the rotation of said cam and into the path of said cam, the other end of said arm extending substantially at right angles to the main portion of said arm, a support for said arm having a plain surface, making a slight angle with said portion of said arm extending at substantially right angles from said main portion of said arm, and a flat spring rigidly attached to said flat surface of said support and to said angular extension of said arm.

6. In a contact device the combination of a rotatable cam, a movable contact point arm actuated by said cam and comprising a stiff strip of thin metal having one end extending on one side of the main portion of said arm in a plane transverse thereto, a rigid support for said arm provided with a plane surface extending transversely to the direction of the main portion of said arm, one end of said surface being adjacent but slightly spaced from the angle between the two portions of said arm above mentioned, the planes of said surface on said arm and on said support, respectively, making a slight angle with each other into which said main portion of said arm extends, and a light spring flexed over said surfaces on said support and arm and attached to said surfaces at points remote from their adjacent edges.

7. In a contact device the combination of a rotatable cam, a stationary contact point, a movable contact point, a movable contact point arm comprising a main portion, a cam engaging tip on one end of said main portion and a transversely extending portion at the other end of said main portion providing a flat surface, said tip and said transversely extending portion being on the same side of aid main portion of said arm, a support for said arm comprising a member mounted on the opposite side of said arm to that from which said ends extend, and provided with a plane surface and a flat spring to press said cam engaging tip toward said cam and to normally hold said contact points together, and having its opposite ends attached to said flat surface on said member and said flat surface on said transversely extending portion of said arm, respectively.

8. In a contact device the combination of a rotatable cam, a stationary contact point, a movable contact point, a movable contact point arm comprising a main portion, a cam engaging tip on one end of said main portion and a transversely extending portion at the other end of said main portion providing a flat surface, said tip and said transversely extending portion being on the same side of said main portion of said arm, a support for said arm comprising a member mounted on the opposite side of said arm to that from which said ends extend, and provided with a plane surface, a flat spring to press said cam engaging tip toward said cam and to normally hold said contact points together and having its opposite ends attached to said flat surface on said member and said flat surface on said transversely extending portion of said arm, respectively, and a stud by which said member is rigidly held in different adjusting positions to vary and adjust the tension of said spring.

9. In a normally closed circuit contact device the combination of a rotatable cam, a relatively stationary contact point, a movable contact point, an arm on which said movable contact point is mounted, one end of said arm projecting into the path of said cam and the other end of said arm being mounted on a flexible spring, the tension of which is to hold said contact points together and to hold the other end of said arm in engagement with said cam, and means to adjust said stationary contact point in a direction toward and away from said movable contact point to adjust the extent of the movement of said movable contact point away from said stationary contact point and the time that said contact points are closed.

10. In a normally closed circuit contact device the combination of a rotatable cam, a relatively stationary contact point, a movable contact point, an arm on which said movable contact point is mounted, one end of said arm projecting into the path of said cam and the other end of said arm being mounted on a flexible spring, the tension of which is to hold said contact points together and to hold the other end of said arm in engagement with said cam, and means to adjust said stationary contact point in a direction toward and away from said movable contact point to adjust the extent of the movement of said movable contact point away from said stationary contact point and the time that said contact points are closed.

11. In a contact device the combination of a base, a rotatable cam mounted on said base, a movable contact point, a stationary contact point, a movable contact point arm operated by said cam and having one end extended at substantially right angles to the main portion of said arm, a flat spring rigidly secured to said extended end of said arm at a point removed from the angle between said extended portion and the main body of said arm, a member mounted on said base and a stud about which as a pivot said member may be adjusted to different positions and secured to said base, said member being provided with a flat surface, one end of which is adjacent but slightly spaced from the angle between said main and extended portions of said arm, the other end of said flat spring being rigidly attached to the flat surface of said member at a point remote from said angle.

12. In a contact device the combination of a base, a rotatable cam mounted on said base, a movable contact point, a stationary contact point, a movable contact point arm operated by said cam and having one end extended at substantially right angles to the main portion of said arm, a flat spring rigidly secured to said extended end of said arm at a point removed from the angle between said extended portion and the main body of said arm, a member mounted on said base, a stud on which as a pivot said member may be adjusted to different positions and secured to said base, said member being provided with a flat surface, one edge of which is adjacent but slightly spaced from the angle between said main extended portions of said arm, the other end of said flat spring being rigidly attached to the flat surface of said member at a point spaced or remote from said angle, a fiber tip secured to the free end of said arm to coöperate with said cam, means to insulate said stationary contact point from said base, a condenser having terminals in electric engagement with said base and stationary contact point, respectively, and means to electrically connect the terminals of an electric circuit to said base and said stationary contact point respectively.

13. In a closed circuit contact device a movable contact point arm or support comprising a flat light stiff member having a fiber cam-engaging tip on one end and having its other end providing a flat surface extending in a plane transverse to the plane of the main portion of said arm, an arm supporting member having a flat surface similar to said flat surface on said transversely extending portion of said arm, but slightly spaced therefrom, and a flat resilient spring rigidly secured to said flat surfaces of said arm and member, respectively, normally lying against said surfaces and attached to said surfaces at points remote from their adjacent edges.

14. In a normally closed circuit contact device the combination of a rotatable cam, a relatively stationary contact point, a movable contact point, an arm on which said movable contact point is mounted, a flat spring, one end of said arm projecting into the path of said cam and the other end of said arm being mounted on said flat spring, the tension of which is to hold said contact points together and to hold the other end of said arm in engagement with said cam, and means to adjust said stationary contact point in a direction toward and away from said movable contact point to vary the length of the time that said movable contact point arm is in engagement with said cam.

15. In a contact device, the combination of a rotatable cam, a movable contact point support comprising a stiff light arm, moved by said cam and provided with a flat surface extending transversely to the direction of the length of said arm, a support also having a flat surface extending transversely to the direction of the length of said arm, and a flat spring rigidly attached to said flat surfaces of said support and arm, said support being slightly spaced from said arm.

16. Ignition apparatus comprising coöperating stationary and movable contacts, an arm carrying said movable contact, a flexible member supporting said arm, and means for actuating said arm, said flexible member permitting said arm to partake of movement whose greatest extent is transverse to the longitudinal extent of said arm and having a small component longitudinally of said arm.

17. Ignition apparatus comprising coöperating stationary and movable contacts, an arm carrying said movable contact, and means for flexibly supporting said arm comprising a spring attached to and extending transversely at a relatively great angle to the longitudinal extent of said arm, and means for actuating said arm.

18. Ignition apparatus comprising coöperating stationary and movable contacts, an arm carrying said movable contact, and means for flexibly supporting said arm comprising a spring attached to and extending approximately at right angles to the longitudinal extent of said arm, and a rotary cam for actuating said arm.

19. Ignition apparatus comprising coöperating stationary and movable contacts, an arm carrying said movable contact, a spring attached to said arm and extending transversely at a relatively great angle with the longitudinal extent of said arm, said spring yielding laterally but not longitudinally, and means for actuating said arm to flex said spring laterally.

20. Ignition apparatus comprising coöperating stationary and movable contacts, an arm carrying said movable contact, a laterally flexible and longitudinally rigid spring attached to said arm at a point offset from one side of said arm, a stationary support on the opposite side of said arm to which said spring is attached at a point offset from said arm, and means for actuating said arm.

21. Ignition apparatus comprising coöperating stationary and movable contacts, an arm carrying said movable contact, a laterally flexible and longitudinally rigid spring attached to said arm at a point offset from one side of said arm and extending approximately at right angles to said arm, a stationary support on the opposite side of said arm to which said spring is attached at a point offset from said arm, and means for actuating said arm.

22. Ignition apparatus comprising coöperating stationary and movable contacts, an arm carrying said movable contact, a laterally flexible and longitudinally rigid spring attached to said arm at a point offset from that side of said arm on which is located said stationary contact and extending transversely at a relatively great angle to said arm, and means for actuating said arm to move the same away from said stationary contact.

23. Ignition apparatus comprising coöperating stationary and movable contacts, an arm carrying said movable contact, a member on said arm extending transversely at a relatively great angle thereto on the side thereof on which said stationary contact is located, a stationary support approximately in alinement with said member and disposed on the opposite side of said arm, a leaf spring overlying said member and said support and secured thereto at points remote from the closest approaching parts of said member and support, and means for actuating said arm in a direction away from said stationary contact.

24. Ignition apparatus comprising coöperating stationary and movable contacts, an arm carrying said movable contact, a member on said arm extending transversely at a relatively great angle thereto on the side thereof on which said stationary contact is located, a stationary support approximately in alinement with said member and disposed on the opposite side of said arm, a leaf spring overlying said member and said support and secured thereto at points remote from the closest approaching parts of said member and support, the distance between said support and said member being a small fraction of the distance between the points of attachment of said spring to said support and said member, and means for actuating said arm in a direction away from said stationary contact.

25. Ignition apparatus comprising coöperating stationary and movable contacts, a moving system of which said movable contact is a part having very small inertia comprising a light substantially rigid arm carrying said movable contact, a leaf spring attached thereto and extending transversely at a relatively great angle with respect to said arm, and a rotary cam for actuating said arm.

26. Interrupter structure comprising a rigid arm carrying an interrupter contact, a cam-engaging shoe extending at an angle to said arm and carried thereby at a distance from said contact, and a single leaf spring solely supporting said arm and secured to said arm at one end thereof and extending at a relatively great angle transversely thereto.

27. Interrupter structure comprising a rigid arm carrying an interrupter contact, and a cam-engaging shoe comprising a plate of fiber secured with a flat face against a portion of said arm extending at an angle to said arm, and a leaf spring secured to said arm at one end thereof and extending transversely thereto.

28. Interrupter structure comprising a movable contact an arm carrying the same and extended at one end to form a projection extending transversely at a relatively great angle thereto, a leaf spring attached to said projection at a distance from said arm, and a bracket member on the opposite side of said arm and approaching closely to said arm but spaced therefrom, said spring attached to said bracket at a point remote from its closest approach to said arm.

29. Interrupter structure comprising a movable contact, an arm carrying the same and extended at one end to form a projection extending transversely at a relatively great angle thereto, a leaf spring attached to said projection at a distance from said arm, a bracket member on the opposite side of said arm and approaching closely to said arm but spaced therefrom, said spring attached to said bracket at a point remote from its closest approach to said arm, the space between said bracket and said arm bridged by said spring being a small fraction of the distance between the points of attachment of said spring to said projection and said bracket.

30. Interrupter structure comprising a bracket member having a portion adapted for attachment to a base and an upstanding member, a contact carrying arm spaced slightly from said upstanding member and extending transversely at a relatively great angle thereto, and a leaf spring attached to said upstanding member and said arm serving as a yielding support for said arm.

31. Interrupter structure comprising a contact arm, a fiber shoe attached to one end thereof, said arm at its opposite end extended at a relatively great angle to form an abutment, a leaf spring attached to said abutment at a distance to one side of said arm, and a support to which said spring is attached slightly spaced from said arm.

32. Interrupter structure comprising a bracket having an upstanding portion, a contact carrying arm slightly spaced from said upstanding portion and having an abutment approximately in alinement with said upstanding portion and disposed transversely at a relatively great angle with the longitudinal extent of said arm, and a leaf spring overlying and attached to said abutment and said upstanding portion.

33. Interrupter structure comprising an arm having at one end a portion extending at a relatively great angle to form an abutment, a shoe on the free end of said arm disposed at an angle to the longitudinal extent thereof, and a contact carried by said arm between said shoe and said abutment.

In testimony whereof I have hereunto affixed my signature this 26th day of March, 1920.

ARTHUR ATWATER KENT.